United States Patent [19]

Sequist

[11] Patent Number: 5,022,350

[45] Date of Patent: Jun. 11, 1991

[54] HORSE MANE GROOMING DEVICE

[76] Inventor: David B. Sequist, P.O. Box 1357, Stowe, Vt. 05672

[21] Appl. No.: 550,114

[22] Filed: Jul. 9, 1990

[51] Int. Cl.$^5$ ............................................. A01K 13/00
[52] U.S. Cl. ....................................... 119/85; 119/93; 132/148
[58] Field of Search ....................... 132/148, 155, 224; 606/133, 211; 119/85, 92, 93, 94

[56] References Cited

U.S. PATENT DOCUMENTS

| | | | |
|---|---|---|---|
| 830,372 | 9/1906 | Scharer . | |
| 943,321 | 12/1909 | Shero | 132/224 |
| 1,132,699 | 3/1915 | Wright | 132/148 |
| 1,171,815 | 2/1916 | Vyvial . | |
| 1,249,552 | 12/1917 | Taflin . | |
| 1,455,696 | 5/1923 | Wright | 132/224 |
| 2,089,177 | 8/1937 | Beldue . | |
| 2,738,767 | 3/1956 | Rosenquist | 119/85 |
| 2,776,667 | 1/1957 | Fitzgerald | 132/224 |
| 2,830,600 | 4/1958 | Churchillo | 132/148 X |
| 2,984,934 | 5/1961 | Land, Jr. . | |
| 3,664,346 | 5/1972 | Dunn | 606/133 |
| 3,893,424 | 7/1975 | Casler | 119/83 |

Primary Examiner—Robert P. Swiatek
Attorney, Agent, or Firm—Chilton, Alix & Van Kirk

[57] ABSTRACT

A grooming device for combing and pulling horse manes and the like comprises a pair of coactive handle members that are easily grasped in one hand. The handle members are pivotally connected and each is provided with a forceps-type hand grip portion and a clamping jaw portion. A transversely extending comb and first clamping member are mounted on one of the jaw portions while a second mating clamping member is provided on the opposite jaw portion. The clamping members are spring biased into an open position and are operative in response to relative movement of the hand grip portions for movement toward each other into an operative position clamping the strands of hair therebetween for pulling. The comb may be a replaceable member mountable on a clamping portion.

10 Claims, 3 Drawing Sheets

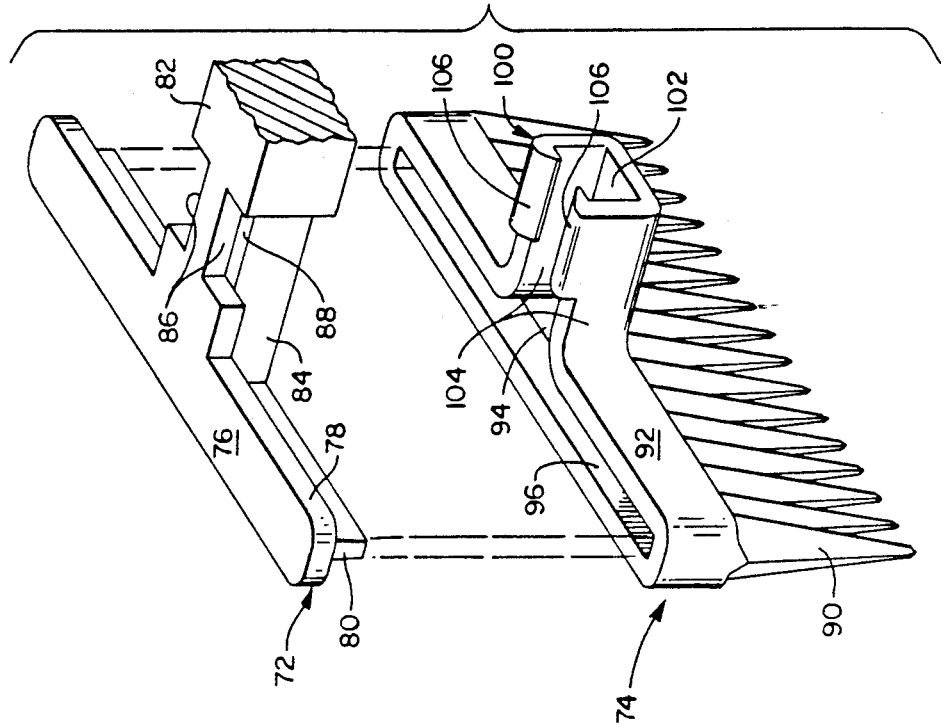
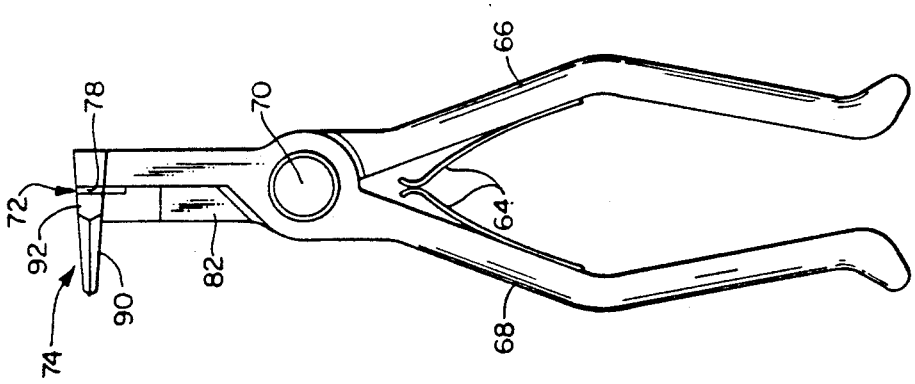

HORSE MANE GROOMING DEVICE

BACKGROUND AND SUMMARY OF THE INVENTION

The present invention relates generally to a grooming device for grooming the mane of a horse or the coat of other long haired animals. More particularly it is concerned with a new and improved equine grooming device that will perform the dual function of combing the horse's mane and effecting the removal of unwanted long strands of hair therefrom.

Heretofore to perform the two functions of combing and pulling, many individuals have simply used only a comb. The mane would be combed in a conventional manner utilizing a comb. The unwanted long strands of hair would then be selected and manually wrapped around the comb. The comb would be securely grasped, preferably by both hands of the user, and used as a pulling handle to remove the unwanted long hair wrapped therearound.

One device for performing the combing/pulling functions on long haired dogs and the like is described by Rosenquist in U.S. Pat. No. 2,738,767. That device includes a broad flat handle having comb teeth at one end. The teeth extend from both sides of the handle within the plane of the flat handle. An upright support protrudes from the flat handle at a right angle thereto and mounts a pair of hinged leaves that contact the handle body on opposite sides of the upright support. The hinged leaf members each are provided with a retaining loop into which the user inserts a thumb to firmly hold the leaf against the handle for capturing the hair of the animal therebetween. With such an arrangement it is not always possible to put significant pressure on the holding leaf simply by using a thumb and therefore slippage will result if both hands are not used. Additionally, since the teeth are in the plane of the handle and the handle is laterally offset from the teeth, a high degree of wrist action is required to properly perform the combing operation.

In accordance with the present invention, a new and improved horse mane grooming device is provided for performing the dual combing/pulling functions in a more facile and efficient manner. The new grooming device not only obviates the need for wrapping the unwanted long hair of the mane around a comb or the like to facilitate pulling thereof but also renders the pulling operation easier on the groom's fingers and hands. At the same time it assures a firm positive grip on the strands of hair being pulled while using only one hand. The grooming device of the present invention also provides for the same smooth straight line grooming action for both the combing and pulling operation using a faster and more natural arm motion.

Other features and advantages will be in part obvious and in part pointed out more in detail hereinafter.

These and related advantages are achieved in accordance with the present invention by providing a new and improved grooming device for combing and pulling horse manes and the like comprising a pair of coactive handle members that are easily grasped in one hand. The handle members are pivotally connected and each is provided with a hand grip portion and a jaw portion. A transversely extending comb and first clamping member are provided on one of the jaw portions while a second mating clamping member is provided on the other jaw portion. The clamping members preferably are spring biased into an open position and are operative in response to relative movement of the hand grip portions for movement toward each other into an operative position clamping the strands of hair therebetween.

A better understanding of the advantages, features and properties of the invention will be obtained from the following detailed description, and the accompanying drawings, that set forth certain illustrative embodiments and are indicative of the various ways in which the principles of the invention are employed.

BRIEF DESCRIPTION OF THE DRAWINGS

In the drawings:

FIG. 5 is a side elevational view of another embodiment of the device.

FIG. 6 is an enlarged exploded view of the detachable comb and lower jaw of the embodiment of FIG. 5.

DESCRIPTION OF A PREFERRED EMBODIMENT

Figure 1:
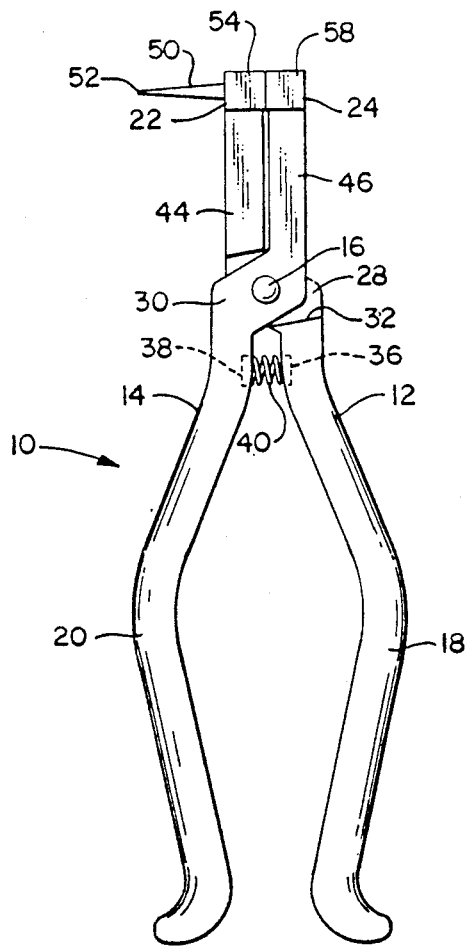
FIG. 1 is a side elevational view of one embodiment of a grooming device of the present invention showing the device in its closed or clamping position.

Referring now to the drawings in greater detail wherein like reference numerals indicate like parts throughout the several figures, the grooming device of the present invention, generally designated by the numeral 10, takes a form similar to that of a pair of pliers or forceps. The forceps 10 consist of a pair of coactive handle members 12,14 pivotally interconnected by a pivot pin 16 intermediate the ends thereof. The handle members 12,14 are provided, respectively, with elongated hand grip portions 18, 20 on one side of the pivot pin connection 16 and jaw portions 22,24 on the opposite side thereof. As shown in FIG. 1, the hand grip portions 18,20 bow slightly midway along their lengths and the free ends thereof are spaced relative to each other even when the handle members 12,14 are in their fully compressed closed position. As will be appreciated, the specific configuration of the hand grip portions as well as the spacing therebetween may vary substantially without departing from the teachings of the present invention.

Figure 4:
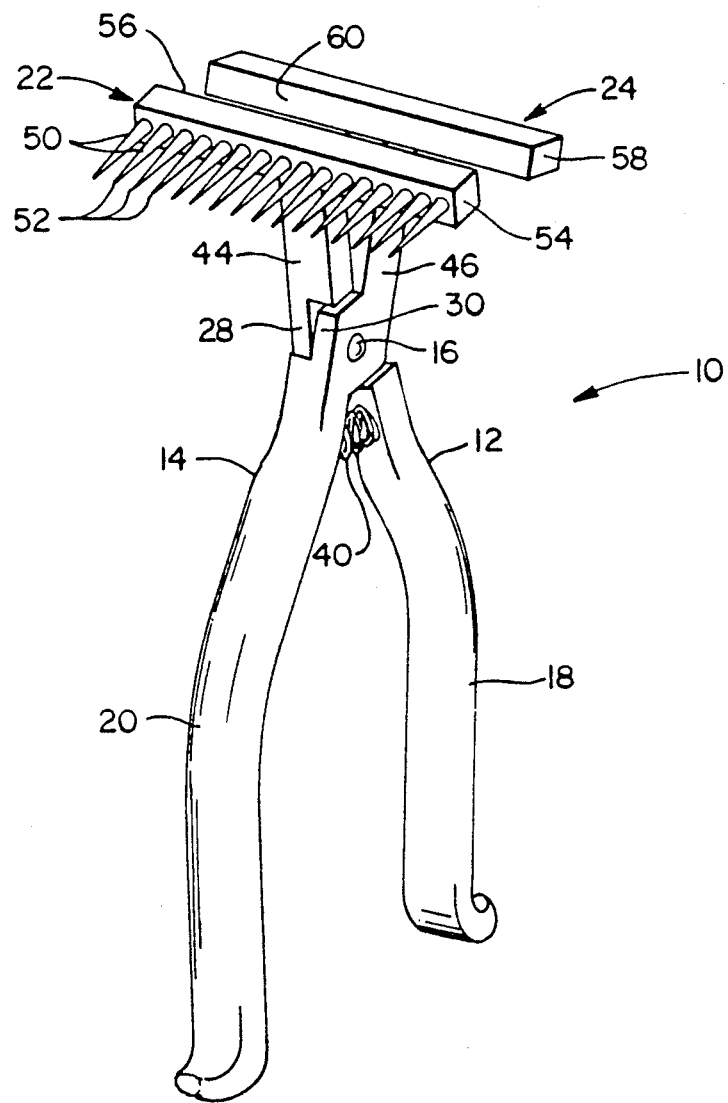
FIG. 4 is a perspective view of the device of FIG. 1 showing the device in an open rest position.

At the pivot pin connection 16 the coactive handle members 12,14 include narrow angularly offset pivot bar segments 28,30 having a thickness approximately equal to one half the thickness of their respective hand grip portions 12,14. The narrow bar segments 28,30 exhibit a thickness that extends transversely from one side of their respective grip portions to a point midway across the thickness thereof and terminate to form shoulder stops 32,34 on the pivot end of the grip portions. Adjacent the pivot connection 16 but spaced slightly therefrom, the hand grip portions also are provided with small confronting recesses 36,38 for mounting a compression spring 40 that extends between the two handle members 12,14 and is operative to bias the hand grip portions and their respective jaw portions into a fully opened position, as shown in FIG. 4. Alternatively, the drive spring may take the form shown in FIG. 5 or may be incorporated into the pivot so as not to be exposed. The shoulder stops 32,34 at the pivot end of the hand grips provide surfaces against which the bar segments 28,30 of the opposite handle members bear when the compression drive spring 40 has driven the handle members to their fully opened position. As will be appreciated, the shoulder stops can be provided on the jaw side of the pivot connection, if desired or eliminated entirely.

The jaw portions 22,24 of the grooming device include transversely extending clamping members spaced from the pivot by elongated integral shank connectors 44,46 that extend from their respective offset pivot bar segments 28,30 toward the free end of the jaw portions. One jaw portion 22 also is provided with a transversely extending comb 50 of conventional configuration that may be integrally formed with its supporting shank connector 44 or may be replaceably secured thereto so that it can be removed and replace in the event one or more teeth 52 of the comb become broken. For example, the comb may be made from a tough durable plastic material, such as "Delrin", whereas the remainder of the device is made from metal or some other material. The plastic comb could be molded directly onto a backing member or an appropriate interconnection can readily be provided between the replaceable comb and the jaw's backing member, as will be described in greater detail in connection with FIGS. 5 and 6. As shown in FIGS. 1-4 the backing member 54 of the comb 50 preferably is coextensive with the comb body and provides a top clamping surface 56 facing toward the opposite jaw portion 24. The opposite jaw is provided with a transversely extending clamping bar 58 having a clamping surface 60 confronting the clamping surface 56 of the backing member 54 and is pivotally moveable toward that surface as the hand grip portions 18,20 of the handles are compressed and driven toward each other against the bias of the compression spring 40.

Figure 3:
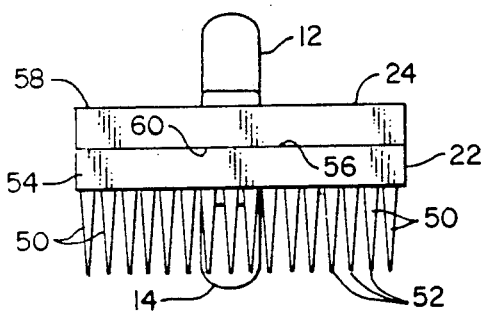
FIG. 3 is a front elevational view showing the jaw portions of the device of FIG. 1.
Figure 2:
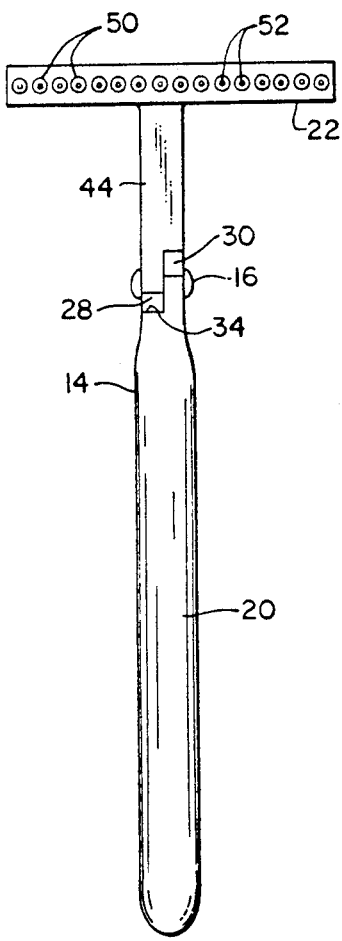
FIG. 2 is a bottom plan view of the device of FIG. 1.

The coacting handle members 12,14 and the transversely extending comb 50 and clamping bar portions 54,58 advantageously exhibit a T-shaped configuration, as best seen in FIG. 2, similar to that of a garden rake so that the combing action can be effected in much the same manner as the operation of a rake. The teeth 52 of the comb 50, which may be of any desired configuration, are shown as extending laterally away from the shank connector 44 at a right angle thereto for a sufficient distance to provide effective penetration into the horse's mane to provide a thorough combing action. If desired, the angular orientation of the teeth may be at a more acute angle to the shank. In either event, the user has the advantage of being able to employ a straight line combing stroke that follows the natural downward movement of the user's forearm with the grooming device simply acting as an extension thereof. A more forceful and easier combing stroke can thereby be achieved, particularly when considering the height of the mane during the grooming operation. Additionally, during combing the user can readily note the unwanted long strands of hair in the mane and can easily place those strands between the clamping surfaces 56,60 of the jaw portions 22,24. Using only one hand, the hand grip portions 18,20 can then be actuated against the bias of the compression spring 40 to firmly and positively compress the griping bars portions 54,58 and securely clamp the strands of hair between the clamping surfaces 56,60. The user may then proceed to pull the unwanted strands from the mane using the same stroke as was used during the combing operation.

As shown in FIGS. 5 and 6 and as mentioned hereinbefore, other handle configurations and drive springs may be employed and the comb may be a replaceable member that is removably secured to one jaw of the grooming tool so that it may be readily replaced with a similar combing or brushing component when necessary. For example, the drive spring may take the form of a leaf spring 64 mounted between the pivot end of hand grip portions 66,68 and having the general configuration shown in FIG. 5. Alternatively, the drive spring can be mounted within the interior of the pivot pin connection 70 so that it is not exposed to strands of hair in the horse's mane and, therefore, is less susceptible to inadvertent snagging of the hair during the grooming operation.

In connection with the modification of the device for employing a detachable comb, FIG. 6 best illustrates one embodiment of a detachable connection between a modified lower jaw portion 72 and a snap-on replaceable comb 74. The flat clamping surface 76 of jaw 72 is substantially the same as clamping surface 56 and is formed as an integral part of the coactive handle member 66. As shown in FIG. 6, the comb mounting and backing member 78 of the jaw 72 is provided with a relatively narrow depending spline 80 that extends along substantially the full length of the backing member and tapers slightly away from backing 78. The integral shank connector 82 extending from the pivot pin 70 toward the backing 78 also is provided with a narrowed base portion 84 that integrally interconnects with the spline 80 and provides support therefore. A pair of opposed recesses 86 at the top of the shank connector 82 are spaced slightly from the backing member 78 and form upwardly facing locking shoulders 88 above the base portion 84 for cooperating with mounting fingers on the comb 74 for securing the comb in place on the jaw portion 72.

The detachable comb 74 includes not only a longitudinally extending array of teeth 90 affixed to a backing 92 but also an elongated recess 94 extending along the top of the backing 92 for substantially the full length thereof. The recess 94 is bounded and defined by a peripheral wall 96 that interconnects with a central rearwardly extending mounting bracket 100. The bracket 100 is of U-shaped configuration so that the channel 102 defined by the side walls 104 thereof centrally intersects the recess 94 extending along the backing of the comb. The size and configuration of the spline 80 conforms to the size and configuration of the recess 94, while the size and configuration of the base portion 84 conforms to the channel 102 defined by the U-shaped bracket 100. Thus, when assembled, the snap-on comb and handle members exhibit the same T-shaped configuration mentioned in connection with the structure described in FIGS. 1-4.

The bracket 100 of comb 74 additionally is provided with a pair of snap-on retaining fingers 106 projecting toward each other above channel 102 from the top of side walls 104 on opposite sides of channel 102. The fingers 106 will flex outwardly during snap-on mounting of comb 74 and will mate with the notches 86 in shank 82 and cooperate with the shoulders 88 to firmly and snugly retain the detachable comb 74 on the jaw 72 of the grooming device.

As will be apparent to persons skilled in the art various modifications, adaptations and variations of the foregoing specific disclosure can be made without departing from the teachings of the present invention.

I claim:

1. A grooming device for combing and pulling horse manes and the like comprising a pair of coactive handle members and a pivot joint therebetween, each member having a hand grip portion and a jaw portion, one jaw portion having transversely extending comb means and a first elongated clamping member, the other jaw portion having a second elongated clamping member coextensive with said first member for receiving therebetween strands of hair transversely to said elongated members, said first and second clamping members being operative in response to relative movement of said hand grip portions for movement toward each other into an operation position clamping said transversely extending strands of hair therebetween for pulling in a direction generally parallel to said hand grip portions.

2. The grooming device of claim 1 including biasing means for driving said clamping members away from each other toward an open rest position.

3. The grooming device of claim 2 wherein said biasing means is a spring and relative movement of said hand grip portions against the bias of said spring is effective to drive said first and second clamping members toward said operative clamping position.

4. The grooming device of claim 1 wherein said first and second clamping members have mating clamping surfaces.

5. The grooming device of claim 1 wherein said first and second clamping members extend transversely to said hand grip portions.

6. The grooming device of claim 1 wherein said comb means includes a set of comb teeth extending from said jaw portion at an angle thereto.

7. The grooming device of claim 1 wherein said comb means includes a replaceable comb mounted on said jaw portion.

8. The grooming device of claim 7 wherein said replaceable comb is made of a durable plastic material.

9. The grooming device of claim 7 wherein said jaw portion includes retaining means and said comb is provided with a bracket cooperating with said retaining means to securely mount said comb on said jaw portion.

10. The grooming device of claim 7 wherein said jaw portion includes a spline projecting therefrom and the comb includes a recess cooperating with the spline for mounting the comb on the jaw portion and snap on retaining means for holding the comb in its mounted position.

* * * * *